(12) United States Patent
Mehr et al.

(10) Patent No.: US 8,694,255 B2
(45) Date of Patent: Apr. 8, 2014

(54) DRIVER ASSISTANCE SYSTEM HAVING REDUCED DATA FROM A DIGITAL ROAD MAP

(75) Inventors: Wilfried Mehr, Wolfurt (AT); Wolfgang Fey, Bodolz (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 410 days.

(21) Appl. No.: 13/057,208

(22) PCT Filed: May 27, 2009

(86) PCT No.: PCT/DE2009/000755
§ 371 (c)(1),
(2), (4) Date: Feb. 2, 2011

(87) PCT Pub. No.: WO2010/015218
PCT Pub. Date: Feb. 11, 2010

(65) Prior Publication Data
US 2011/0137559 A1 Jun. 9, 2011

(30) Foreign Application Priority Data

Aug. 6, 2008 (DE) .......................... 10 2008 036 559
Aug. 14, 2008 (DE) .......................... 10 2008 037 705

(51) Int. Cl.
*G01C 21/26* (2006.01)
*B60W 40/06* (2012.01)
*B60W 30/16* (2012.01)

(52) U.S. Cl.
USPC ........... 701/540; 701/430; 701/408; 701/469; 340/988; 340/995.1; 340/995.12

(58) Field of Classification Search
CPC ........ G01C 21/26; G01C 21/28; G01C 21/36; G01C 21/3602; B60W 2550/402; B60W 40/06; B60W 30/16; B60W 50/14
USPC .......... 701/117, 123, 208, 29.1, 301, 36, 408, 701/430, 45, 469, 514, 523, 532, 540; 340/988, 995.18

See application file for complete search history.

(56) References Cited

U.S. PATENT DOCUMENTS 6,459,967 B1   10/2002   Otto
6,560,529 B1 *  5/2003   Janssen .......................... 701/469

(Continued)

FOREIGN PATENT DOCUMENTS

DE   198 39 193   3/2000
DE   198 42 176   3/2000

(Continued)

OTHER PUBLICATIONS

German Search Report for German Application No. 10 2008 036 559.9, dated Dec. 19, 2008, 4 pages, with English translation, 4 pages, Muenchen, Germany.

(Continued)

*Primary Examiner* — Thomas Tarcza
*Assistant Examiner* — Adam Tissot
(74) *Attorney, Agent, or Firm* — W. F. Fasse

(57) ABSTRACT

A driver assistance system for a motor vehicle has a surroundings sensor and an evaluation unit for evaluating the surroundings sensor data. The evaluation unit receives data from a positioning device. Furthermore, a reduced or limited subset of data taken from a digital roadmap is stored in a non-volatile memory, which is provided to the evaluation unit. The reduced data are selected to include only data relevant for the function(s) of the driver assistance system. Thereby the driver assistance system does not need to be connected for data transmission with a navigation system.

11 Claims, 1 Drawing Sheet

(56) References Cited

U.S. PATENT DOCUMENTS

| | | |
|---|---|---|
| 7,216,032 B2 | 5/2007 | Graf et al. |
| 7,728,869 B2 * | 6/2010 | Jung .................. 348/113 |
| 7,873,467 B2 | 1/2011 | Aleksic et al. |
| 2001/0051850 A1 | 12/2001 | Wietzke et al. |
| 2003/0065432 A1 * | 4/2003 | Shuman et al. ........... 701/48 |
| 2008/0027607 A1 | 1/2008 | Ertl et al. |
| 2010/0198488 A1 | 8/2010 | Groitzsch et al. |
| 2010/0241605 A1 | 9/2010 | Groitzsch et al. |

FOREIGN PATENT DOCUMENTS

| | | |
|---|---|---|
| DE | 100 07 813 | 9/2001 |
| DE | 102 44 329 | 4/2004 |
| DE | 102004019337 | 11/2005 |
| DE | 102004048468 | 4/2006 |
| DE | 102006017178 | 10/2007 |
| DE | 102008023972 | 11/2008 |
| WO | WO 02/081252 | 10/2002 |

OTHER PUBLICATIONS

International Search Report of the International Searching Authority for International Application PCT/DE2009/000755, mailed Aug. 18, 2009, 2 pages, European Patent Office, HV Rijswijk, Netherlands.

English Translation of PCT Written Opinion of the International Searching Authority for International Application PCT/DE2009/000755, mailed Aug. 18, 2009, 8 pages, European Patent Office, HV Rijswijk, Netherlands.

* cited by examiner

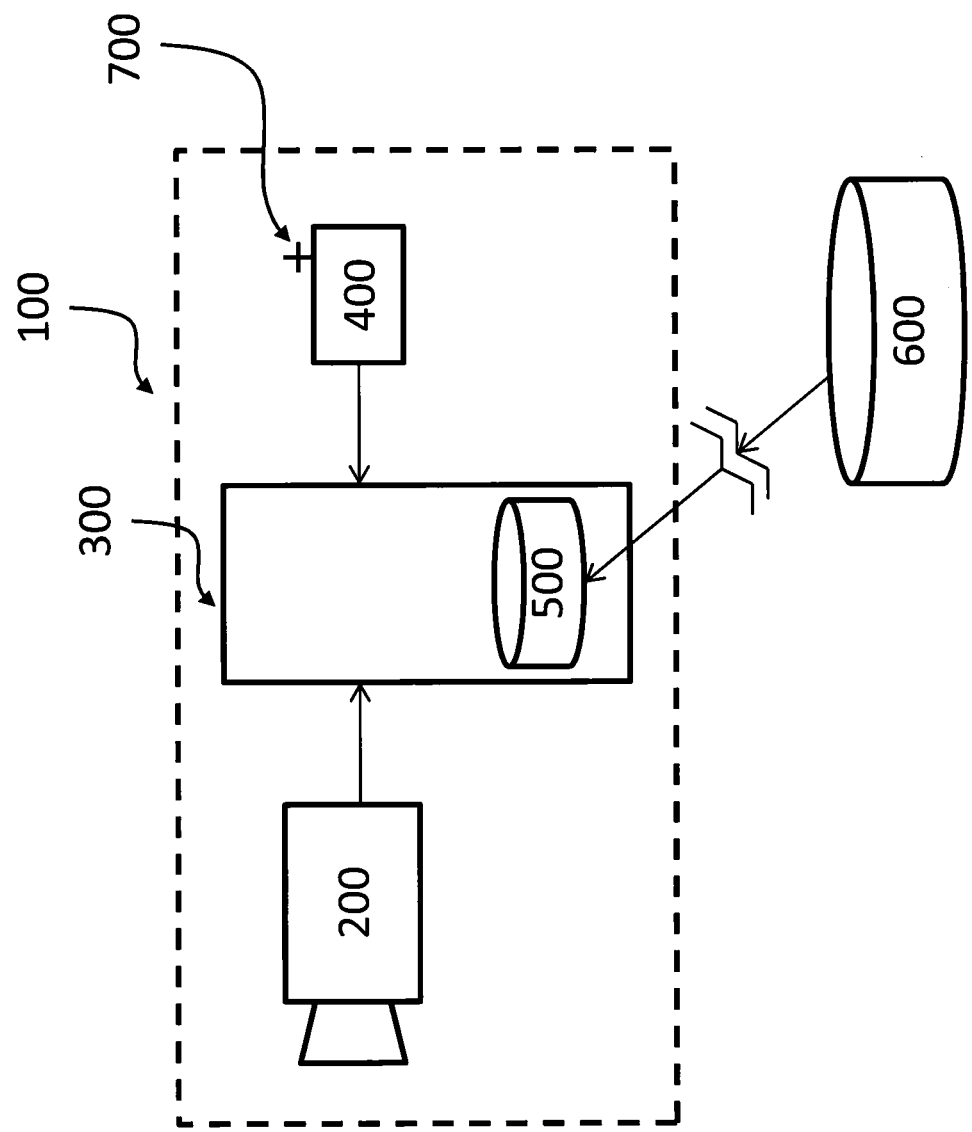

DRIVER ASSISTANCE SYSTEM HAVING REDUCED DATA FROM A DIGITAL ROAD MAP

FIELD OF THE INVENTION

The invention relates to a driver assistance system for a vehicle that uses data from a digital road map for carrying out or supplementing a function of the driver assistance system.

BACKGROUND INFORMATION

The state of the art of traffic sign recognition by means of surroundings sensors in a car, in particular of the recognition of speed limits by means of a camera system, consists in coupling the driver assistance system with a navigation system in order to obtain additional information from the digital road map stored therein, wherein said navigation system is available in the vehicle. Said additional information is necessary for informing the driver of the current speed limit as precisely as possible. Depending on the specific application of the driver assistance system, camera systems, radar systems, lidar systems or ultrasonic systems are used as surroundings sensors.

For example, the state-of-the-art industrialized cameras in vehicles are still unable to make use of place name signs for recognizing that the vehicle is entering a built-up area and therefore obtain speed limit information from the digital road map and from the current place from the GPS navigation system.

Coupling the surroundings sensor with a navigation system results in considerable extra costs of the driver assistance system.

SUMMARY OF THE INVENTION

The invention describes a possibility of avoiding the coupling of the surroundings sensor with a navigation system.

An embodiment of the invention is directed to a driver assistance system for a motor vehicle, comprising a surroundings sensor, a positioning device, an evaluation unit, and a non-volatile memory. The evaluation unit is connected to the surroundings sensor and to the positioning device, and is adapted to receive and evaluate sensor data from the surroundings sensor and positioning data from the positioning device. The non-volatile memory stores reduced or limited data that have been selected, from more-extensive data available in a digital road map, dependent on at least one function of the driver assistance system such that the limited data include only data relevant for the function or functions of the driver assistance system. Furthermore, the driver assistance system is not connected to the digital road map and does not have access to the more-extensive data available in the digital road map. Thereby, for example, the invention avoids coupling the driver assistance system with a navigation system that includes the digital road map.

BRIEF DESCRIPTION OF THE DRAWING

The single drawing FIGURE is a schematic block diagram of major components of an embodiment of a driver assistance system according to the invention.

DETAILED DESCRIPTION OF PREFERRED EXAMPLE EMBODIMENTS OF THE INVENTION

As schematically represented in the block diagram of the single drawing FIGURE, an embodiment of the inventive driver assistance system 100 for a motor vehicle comprises a surroundings sensor 200 such as a camera, and an evaluation unit 300 for evaluating sensor data, wherein the evaluation unit 300 is further provided with data from a positioning device 400 and reduced or limited data selected from a digital road map of a navigation system 600. The reduced or limited data are preferably stored in a non-volatile memory 500.

Preferably, the data from the digital road map are reduced or selected and limited dependent on the function of the driver assistance system. So, according to one exemplary embodiment of the invention, for example only the digital-road-map information relevant to traffic sign recognition is taken from the digital road map and stored as the reduced or limited data in the non-volatile memory 500.

In a further exemplary embodiment, the driver assistance system compares the determined position of the motor vehicle with the reduced data of the digital road map in order to be able to perform its particular function. Such a function is a speed assistant, for example.

If the driver assistance system is used for traffic sign recognition, for example, the digital road map can be reduced to the position data of traffic signs or to the area of application of traffic signs, for example, whereas the digital road map can be reduced to the positions of points where the vehicle is entering or leaving a built-up area if the driver assistance system is to determine the maximum permissible speed, for example. Further reduced data are information on road works, bridges, the condition of the roadway, the number of traffic lanes, and the course of the current traffic lane, for example.

Along with the knowledge of the current position of the motor vehicle, the driver assistance system preferably determines from the reduced data the data necessary for performing the desired function. For example, by comparing the determined position of the motor vehicle with the positions of the boundary of a built-up area, the driver assistance system determines whether the current maximum permissible speed is 50 km/h or 100 km/h. As an alternative, the distinction between positions within built-up areas and positions outside built-up areas can also be used for light control (low beam/high beam). By contrast, a Lane Keeping Assist System would determine the course of the current traffic lane and the number of traffic lanes existing in the current road section from the reduced data of a digital road map, for example.

Surroundings sensors that detect the surroundings of a vehicle only in the horizontal direction are often unable to distinguish between a bridge and an obstacle on the roadway (e.g. a stationary motor lorry). For supporting this distinction to be made by the evaluation unit or as a basis for said distinction, information on bridges (the position of the bridge, possibly also the height of the bridge) is used, according to a further preferred exemplary embodiment, as reduced data of the digital road map.

This reduced information is preferably stored in a non-volatile electronic memory 500 and delivered to the evaluation unit (ECU) 300 of the surroundings sensor 200, in particular of the camera 200. In particular, the non-volatile electronic memory 500 can be an SD card. The costs of this memory are very low because it is widely used in the field of consumer electronics so that this memory is particularly attractive for products in the retrofitting business.

Since the relevant information for traffic sign recognition requires a very small memory only, this memory 500 can be integrated preferably and cheaply into the ECU 300 of the surroundings sensor 200, e.g. the camera. No connection to the navigation system 600 is necessary as represented in the drawing FIGURE by a broken arrow from the navigation system 600 to the memory 500 in the evaluation unit 300.

Instead, the limited or reduced subset of data is loaded from the digital road map of the navigation system 600 into the memory 500, and the memory is installed into or connected to the driver assistance system 100 or particularly the evaluation unit 300.

The current position of the motor vehicle is required for synchronizing the information from the non-volatile memory with the surroundings interpretation made by the surroundings sensor. The current position of the motor vehicle can be obtained either from an integrated GPS antenna 700 or from the vehicle bus, e.g. transmitted by an eCall system.

Traffic sign recognition is only one of the applications of this invention in the field of driver assistance systems. On principle, the method of an application-specific or function-specific reduction of the information of a digital road map and the storage thereof in a non-volatile electronic memory for decoupling from the navigation system is applicable to many vehicle systems.

The major advantages of this system design are the following:
Vehicle functions that require information of a digital road map do not have to be coupled with a navigation system.
The inventive system approach facilitates the use in the retrofitting business.

The invention claimed is:

1. A driver assistance system for a motor vehicle, comprising:
   a surroundings sensor;
   a positioning device;
   a non-volatile memory storing limited data that are a limited subset of more-extensive data stored in a digital road map, such that the limited data include only data relevant for at least one function of the driver assistance system; and
   a data processing unit, wherein the surroundings sensor, the positioning device and the non-volatile memory are each connected for data transmission to the data processing unit; and
   wherein the driver assistance system is not connected to the digital road map by any permanent data transfer link and does not have access to the more-extensive data available in the digital road map during data transmission to the data processing unit.

2. The driver assistance system according to claim 1, wherein the digital road map is included in a navigation assistance system of the motor vehicle, and the driver assistance system is not coupled with the navigation assistance system.

3. The driver assistance system according to claim 1, wherein the data processing unit is programmed to carry out the at least one function of the driver assistance system by comparing the limited data with positioning data received from the positioning device.

4. The driver assistance system according to claim 1, wherein the non-volatile memory is an SD memory card.

5. The driver assistance system according to claim 1, wherein the non-volatile memory is integrated into the data processing unit.

6. The driver assistance system according to claim 1, further comprising a GPS antenna connected to the positioning device, wherein positioning data are received via the GPS antenna.

7. The driver assistance system according to claim 1, further comprising an eCall system connected to the positioning device, wherein positioning data are received from the eCall system.

8. The driver assistance system according to claim 1, wherein the at least one function of the driver assistance system includes a function of recognizing traffic signs, and the limited data include data related to traffic signs.

9. The driver assistance system according to claim 1, wherein the at least one function of the driver assistance system includes a function of determining a maximum permissible speed, and the limited data include data related to the maximum permissible speed.

10. The driver assistance system according to claim 1, wherein the at least one function of the driver assistance system includes a function of distinguishing between bridges and obstacles on a roadway, and the limited data include data related to bridges on the roadway.

11. The driver assistance system according to claim 1, in combination with and incorporated in the motor vehicle, wherein the motor vehicle further includes a navigation system that includes the digital road map, wherein the driver assistance system is not connected with the navigation system, and wherein data from the digital road map can be provided to the driver assistance system only in the limited data stored in the non-volatile memory.

\* \* \* \* \*